DESIGN.

G. B. THOMAS.

SNAP SWITCH COVER.

Reissued June 11, 1918. APPLICATION FILED DEC. 7, 1915. 14.483.

Witness:-
Elias K. Sims

Inventor
GEORGE B. THOMAS
By his Attorneys
Hyson and Hyson

UNITED STATES PATENT OFFICE.

GEORGE B. THOMAS, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

DESIGN FOR A SNAP-SWITCH COVER.

14,483. Specification for Reissued Design. Reissued June 11, 1918.

Original No. 81,271, dated September 11, 1917, Serial No. 85,621, filed December 7, 1915, for 3½ years. Application for reissue filed April 15, 1918. Serial No. 229,476. Term of patent 14 years.

*To all whom it may concern:*

Be it known that I, GEORGE B. THOMAS, a citizen of the United States of America, and residing in Bridgeport, in the county of Fairfield and State of Connecticut, have invented a new and ornamental Design for an Article of Manufacture, of which the following is a specification, reference being had to the accompanying drawing, forming part thereof, and in which—

Figure 1:
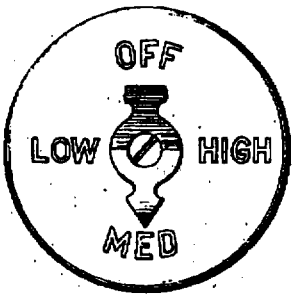
Figure 2:
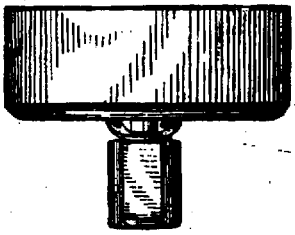

Figure 1 is a plan; and Fig. 2 a side elevation of a snap switch cover and thumb piece showing my new design.

My new design is particularly applicable to a cover and operating thumb piece for electric snap switches, but it is to be understood that it is applicable also to switch rosettes, attachment plug switches and in general to any switches in which a cover of the type shown is employed and in which the operating thumb piece lies outside this cover and rotates step by step thereon. The opposite ends of the thumb piece are preferably of different colors as shown.

I claim as my invention:—

The ornamental design for an article of manufacture substantially as shown.

GEORGE B. THOMAS.

Witnesses:
G. W. GOODRIDGE,
H. M. WICHERT.